United States Patent
Lee et al.

(10) Patent No.: US 7,397,808 B2
(45) Date of Patent: Jul. 8, 2008

(54) PARALLEL SWITCHING ARCHITECTURE FOR MULTIPLE INPUT/OUTPUT

(75) Inventors: Hyoung-Il Lee, Kwacheon (KR); Seung Woo Seo, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 1039 days.

(21) Appl. No.: 10/457,225

(22) Filed: Jun. 9, 2003

(65) Prior Publication Data

US 2004/0085979 A1    May 6, 2004

(30) Foreign Application Priority Data

Oct. 31, 2002   (KR) .................... 10-2002-0066889

(51) Int. Cl.
*H04L 12/56* (2006.01)
(52) U.S. Cl. ............ 370/413; 370/386; 370/411; 370/412; 370/419
(58) Field of Classification Search .......... 370/317, 370/391
See application file for complete search history.

(56) References Cited

U.S. PATENT DOCUMENTS 7,136,381 B2 * 11/2006 Battle et al. .................. 370/389

2001/0038634 A1 * 11/2001 Dally et al. .................. 370/412

FOREIGN PATENT DOCUMENTS

KR    2001-37202    5/2001

OTHER PUBLICATIONS

Chuang, et al. "Matching Output Queueing with a Combined Input Output Queued Switch", IEEE J. Select. Areas Commun., vol. 17, pp. 1030-1039, Dec. 1999.
Iyer, et al., "Analysis of a packet switch with memories running slower that the line-rate", IEEE INFOCOM 2000, vol. 2, pp. 529-537, Mar. 2000.

* cited by examiner

*Primary Examiner*—Huy D Vu
*Assistant Examiner*—Salvador E. Rivas
(74) *Attorney, Agent, or Firm*—Merchant & Gould P.C.

(57) ABSTRACT

A multiple input/output-queued(MIOQ) switch is presented. This MIOQ switch comprises a (k,m)-dimensional crossbar fabric having k ingress lines and m egress lines; N input buffers at each input; M output buffers at each output; N×k interconnection networks each of which is able to move a packet from each input to one of the k egress lines; and m×M interconnection networks each of which is able to move the arrived packet at output from the m egress lines to one of the M(wherein M is m or N) output buffers. The multiple input/output-queued(MIOQ) switch according to the present invention requires no "speed-up". Performance matches the performance of an output-queued switch.

17 Claims, 19 Drawing Sheets

PRIOR ART

PARALLEL SWITCHING ARCHITECTURE FOR MULTIPLE INPUT/OUTPUT

BACKGROUND OF THE INVENTION

1. Field of the Invention

The present invention relates to a switch having multiple input buffers and multiple output buffers. Especially, an implementing method for a scheduler driving a crossbar fabric having multiple ingress lines and egress lines, and a queue management method guaranteeing the order of packets which belong to the same flow. Hereinafter, the switch having multiple input buffers and multiple output buffers in the present invention is referred to as "multiple input/output-queued switch(MIOQ switch)".

2. Description of the Related Art

In order to access the Internet nowadays, a very high-speed switch(or router, hereinafter referred to as "switch") for optical communication is indispensable. The usual Internet backbone is composed of high-speed electrical switches which are connected via fiber-optic links. Currently, a single fiber can have multiple wavelength channels each of which operates at 2.5 Gpbs or 10 Gbps, and the overall transmission capacity through optical fibers has increased to over a few terabits per second. Compared to the tremendous capacity of optical links, the switching capacity enhancement of electrical switches becomes a relative bottleneck for the Internet backbone. Moreover, there is a pressing demand for the guarantee of quality-of-service(QoS) in the use of the Internet, which is another responsibility of backbone switches.

The high bandwidth requirement of switches makes the input-queued switch illustrated in FIG. 1 an attractive candidate since its memory and switch fabric can operate only at the line speed. However, this input-queued switch cannot achieve a comparable QoS performance to the output-queued switch illustrated in FIG. 2. To satisfy both the requirements of high switching capacity and QoS guarantees simultaneously, the combined input/output-queued(CIOQ) switch illustrated in FIG. 3 has been proposed as a solution. In the CIOQ switch, the switch fabric operates at a faster speed than the link rate by the speedup s, and in a single time slot, at most s packets can be delivered from each input buffer to each output buffer, which requires buffering of the packets at outputs as well as inputs.

There have been many research works on the minimum speedup to match the performance of an output-queued switch. S. T. Chuang, et al. showed that a speedup of 2 in a CIOQ switch can provide the same delay performance of an output-queued switch using the stable marriage matching (SMM) algorithm [S. T. Chuang, A. Goel, N. McKeown and B. Prabhakar, "Matching Output Queueing with a Combined Input and Output Queued Switch", IEEE J. Select. Areas Commun., Vol. 17, pp. 1030-1039, December 1999].

However, the speedup of the switch fabric needs memories with shortened access time and requires a scheduler to make scheduling decisions within a reduced time, which is a non-trivial difficulty even for a speedup of only 2. Therefore, in a recent approach to achieve the comparable performance of an output-queued switch with no speedup, a parallel switching architecture(PSA) has been studied by S. Iyer, et al. [S. Iyer, A. Awadallah, and N. McKeown, "Analysis of a Packet Switch with Memories Running Slower than the Line-Rate", IEEE INFOCOM'2000, Vol. 2, pp. 529-537, March, 2000]. The PSA is composed of input demultiplexers, output multiplexers and parallel switches. In the PSA, an incoming stream of packets are spread packet-by-packet by a demultiplexer across the parallel switches, then recombined by a multiplexer at each output.

While the parallel switch does not require any speedup, the performance of the parallel switch depends on a quite complex centralized distribution algorithm, which has a similar complexity to that of the SMM algorithm used for a CIOQ switch. Therefore, its implementation at a high operation rate is not practical for the emulation of output-queueing.

SUMMARY OF THE INVENTION

In the present invention, a practical approach to match the performance of an output-queued switch with an MIOQ switch statistically is provided. To make an MIOQ switch practical, a multi-token-based arbiter to schedule the transmitting sequence of packets from input buffers to output buffers and a virtual FIFO (First Input First Output) queueing scheme to guarantee the FIFO sequence of packets at outputs are provided. Since the present invention is based on a simple round-robin operation, it can be easily implemented at a high operation rate.

DESCRIPTION OF THE PREFERRED EMBODIMENTS

Reference will now be made in more detail to the MIOQ switch according to the present invention as illustrated in the accompanying drawings.

Figure 1:
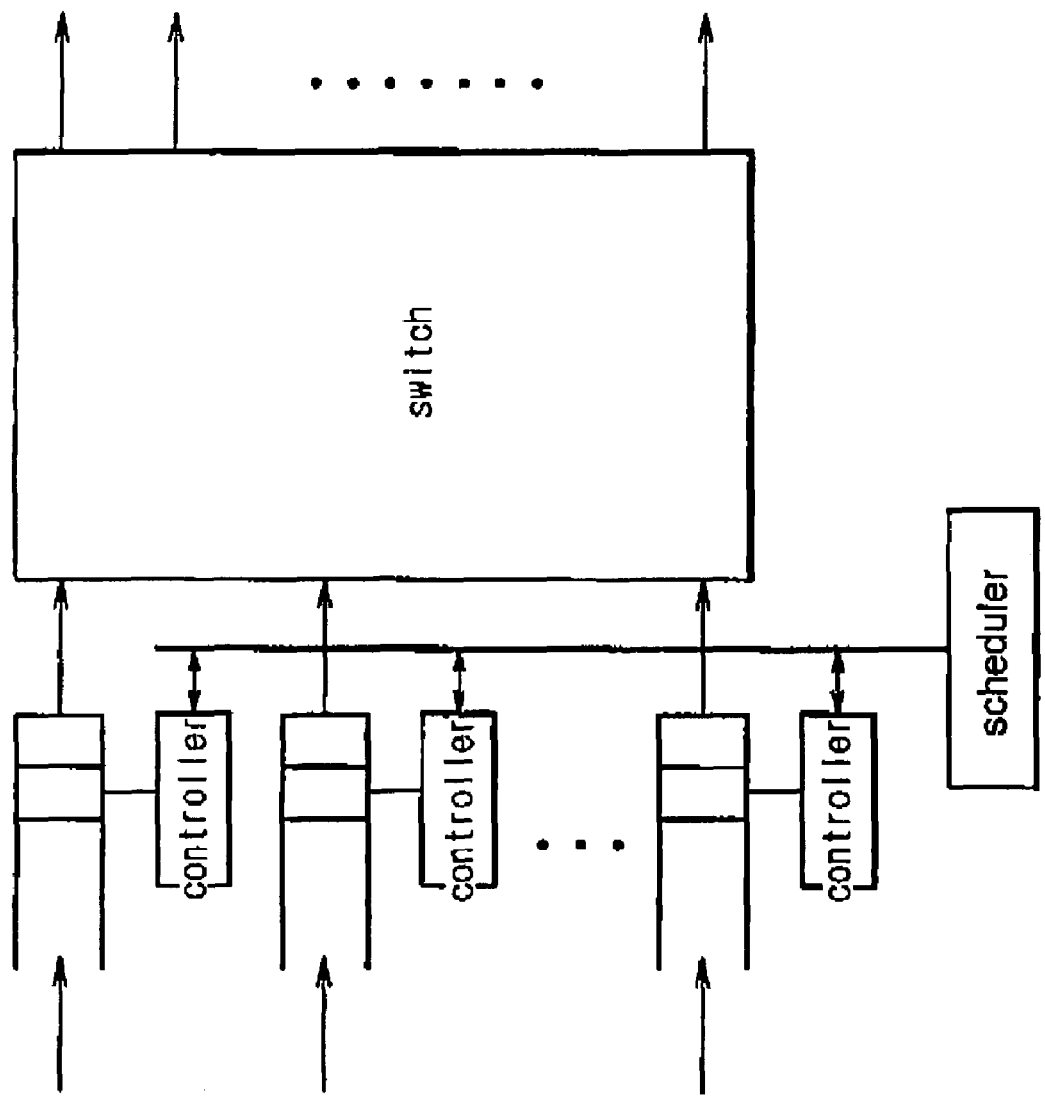
FIG. 1 illustrates a prior art input-queued switch.
Figure 2:
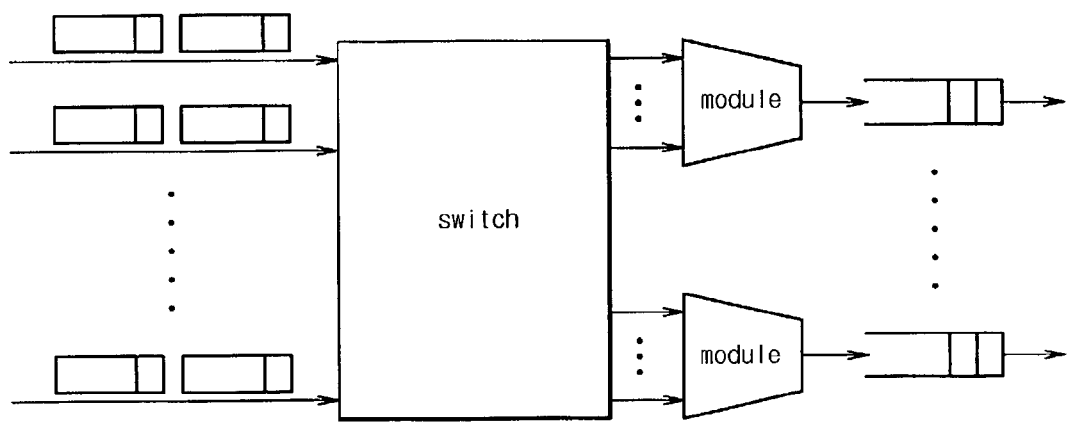
FIG. 2 illustrates a prior art output-queued switch.
Figure 3:
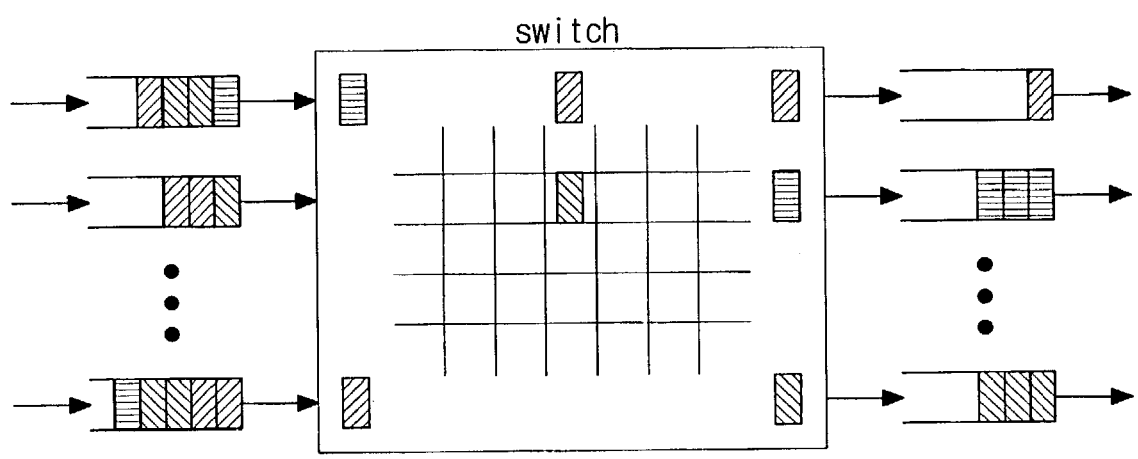
FIG. 3 illustrates a prior art combined input/output-queued (CIOQ) switch.
Figure 4:
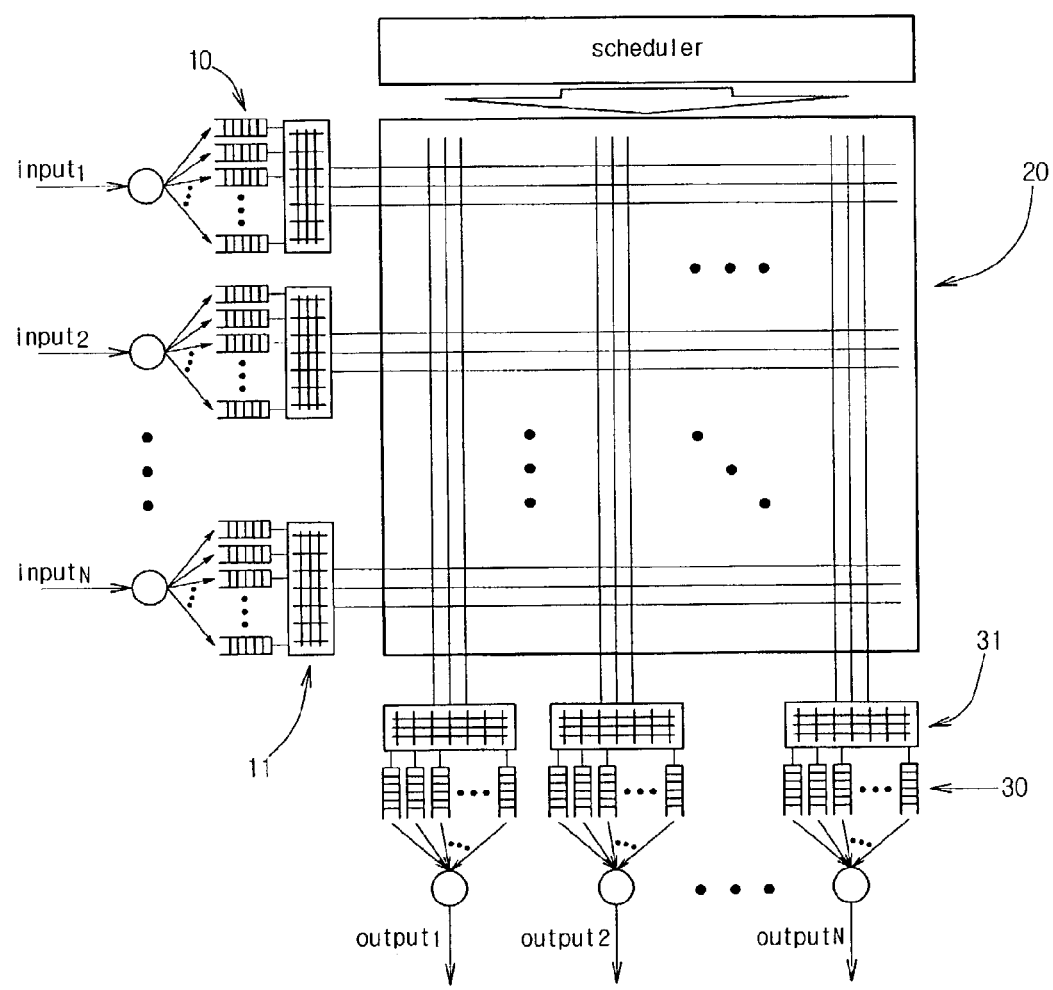
FIG. 4 illustrates a multiple input/output-queued (MIOQ) switch according to the present invention.

FIG. 4 illustrates a multiple input/output-queued (MIOQ) switch according to the present invention. The MIOQ switch of size N comprises N input buffers at each input, M output buffers at each output, and a (k,m)-dimensional crossbar fabric. M may be the number of egress lines (i.e., m) or the size of switch (i.e., N) depending on disciplines when the packets of output buffers are transmitted to the output ports. More specifically, M may be m for a FIFO queueing discipline, and otherwise M may be N for a QoS queueing discipline.

For example, FIG. 4 illustrates an N×N MIOQ switch with a (3,3)-dimensional crossbar fabric.

In the MIOQ switch according to the present invention, N input buffers (10) at each input port are used for virtual output queueing to eliminate a well-known head-of-line blocking. A (k,m)-dimensional crossbar fabric (20)(hereinafter referred to as a "(k,m)-dim crossbar") provides k ingress lines for each input and m egress lines for each output. So, in a (k,m)-dim crossbar, up to k packets can leave from each input and up to m packets can be delivered to each output within a time slot. Since no speedup is assumed in any part of MIOQ switch, only one packet from each input buffer can be selected and moved to one of k ingress lines via the N×k interconnection network (11).

Also, to exclude a necessity of speedup at outputs, an output buffer is divided into M multiple ones, each of which is accessed only once in a time slot by each of m packets delivered to output. For a FIFO queuing discipline, we need m separate buffers (30) at each output with a particular queue management scheme to avoid mis-sequencing of packets, which will be described below (M=m). For a QoS queueing discipline, we need at least N physically-separated buffers each of which corresponds to each input (M=N). Since more than two packets from an input are not delivered to an output simultaneously in a time slot, at most m packets from egress lines at an output can be moved to corresponding output buffers according to their inputs respectively with no speedup. The m×M interconnection networks (31) are located in front of the output buffers (30).

The scheduler in the MIOQ switch according to the present invention makes a scheduling decision, in every time slot, that includes which input buffers to read, which output buffers to write to and a configuration of the (k,m)-dim crossbar. In the first scheduling step, each input sends to the scheduler a request message which includes the information on the head-of-line packet in each input buffer. Since only one packet can depart from an input buffer in a time slot, it does not need to consider the packets behind the head-of-line in a scheduling process. Then, the scheduler selects the packets to be transferred in a time slot and controls the (k,m)-dim crossbar.

To implement the MIOQ switch with a (k,m)-dim crossbar according to the present invention, there are two challenging problems to be resolved. First, since at most k packets can be removed from each input and at most m packets can be delivered to each output, a scheduler to find a many-to-many assignment between inputs and outputs in a limited time is required. Second, since the MIOQ switch has multiple buffers at each output, a queue management scheme to avoid a possible mis-sequence problem among packets in different buffers should be proposed.

First, a scheduling method for the MIOQ switch with a (k,m)-dim crossbar according to the present invention is explained below.

Figure 5:
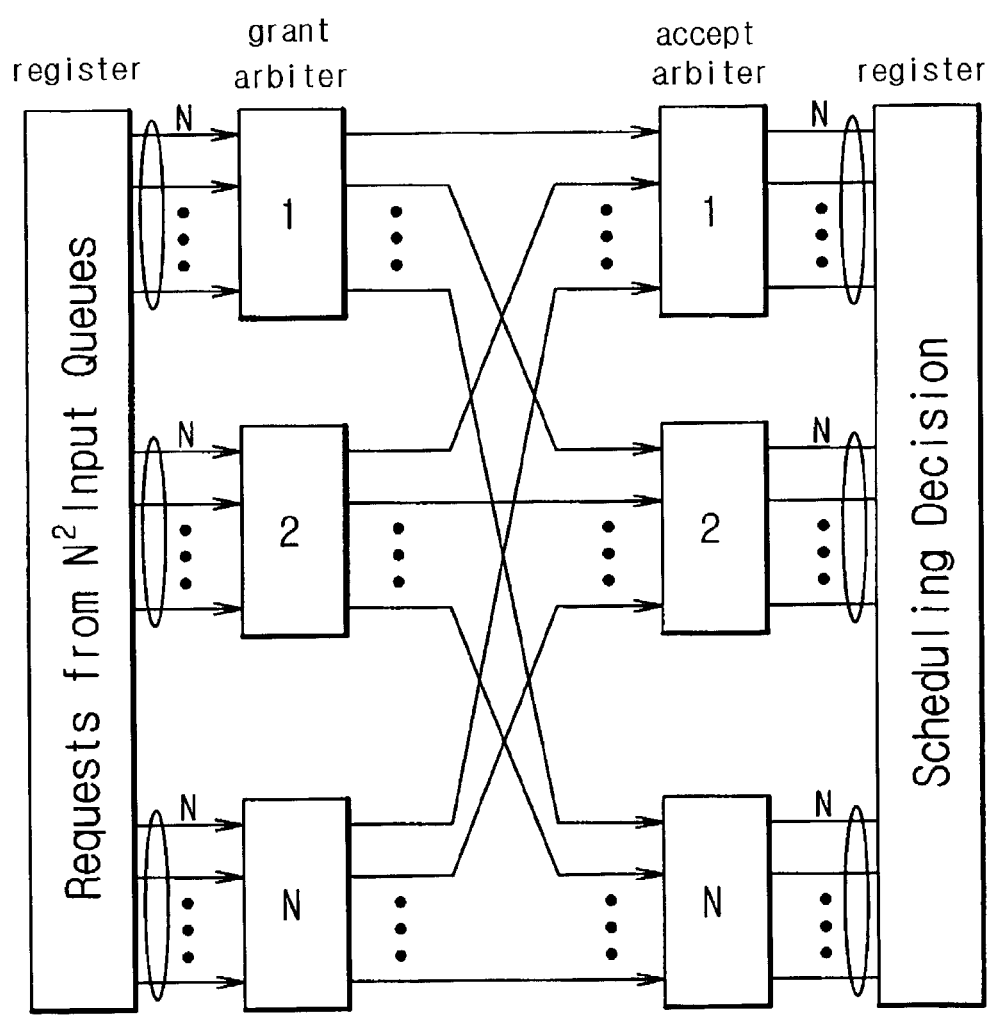
FIG. 5 illustrates a hardware implementation of the iterative matching algorithm.

To resolve this scheduling problem of the MIOQ switch, an iterative matching algorithm is provided which comprises three phases, i.e., request, grant and accept, like other iterative matching algorithms for input-queued switches. Since the goal is to design a scheduler implementable at a high operation rate, the simplicity and scalability of an iterative matching algorithm is an important motivation to adopt this algorithm for scheduling the MIOQ switch. The major difference of the proposed algorithm from other iterative matching algorithms for input-queued switches is that the proposed novel algorithm is able to grant up to k requests for each output and to accept up to m grants for each input. The hardware implementation of the iterative matching algorithm are shown in FIG. 5. Several kinds of arbiters to select multiple requests (or grants) in a single phase for the implementation of the proposed algorithm are designed below.

For the complete description of the proposed algorithm, it is required to specify the selection rule of multiple requests (or grants) in an arbiter. Among two basic principles, i.e., randomness and round-robin, the round-robin principle is preferable because it is easier to implement than random selection. The designed arbiter is called "multi-token-based arbiter", which has the same number of tokens as the maximum number of admittable requests (or grants).

Figure 6:
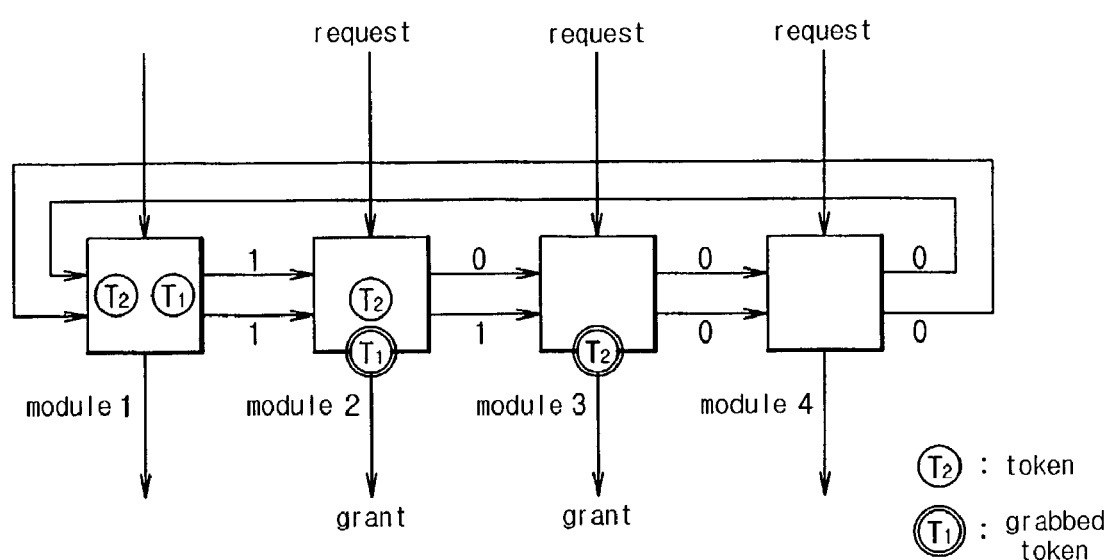
FIG. 6 illustrates a straightforward implementation of the multi-token-based arbiter in the present invention.

FIG. 6 illustrates a straightforward implementation of a multi-token-based arbiter. In this figure, initially, the module 1 of the arbiter has two tokens, i.e., token 1 and token 2. In the first clock, the two tokens are passed from module 1 to module 2, and then, the token 1 is grabbed by the module 2 for its request. In the second clock, the token 2 is passed to the module 3, and it is grabbed by the module 3 for its request. Hence, the requests of module 1 and module 2 are granted. In this design, however, since the remaining number of tokens is represented by a binary number, the hardware complexity increases as the number of tokens increases, and also, the implementation depends on its number of tokens. To represent k tokens, $\log_2 k$ control lines are required.

Figure 7:
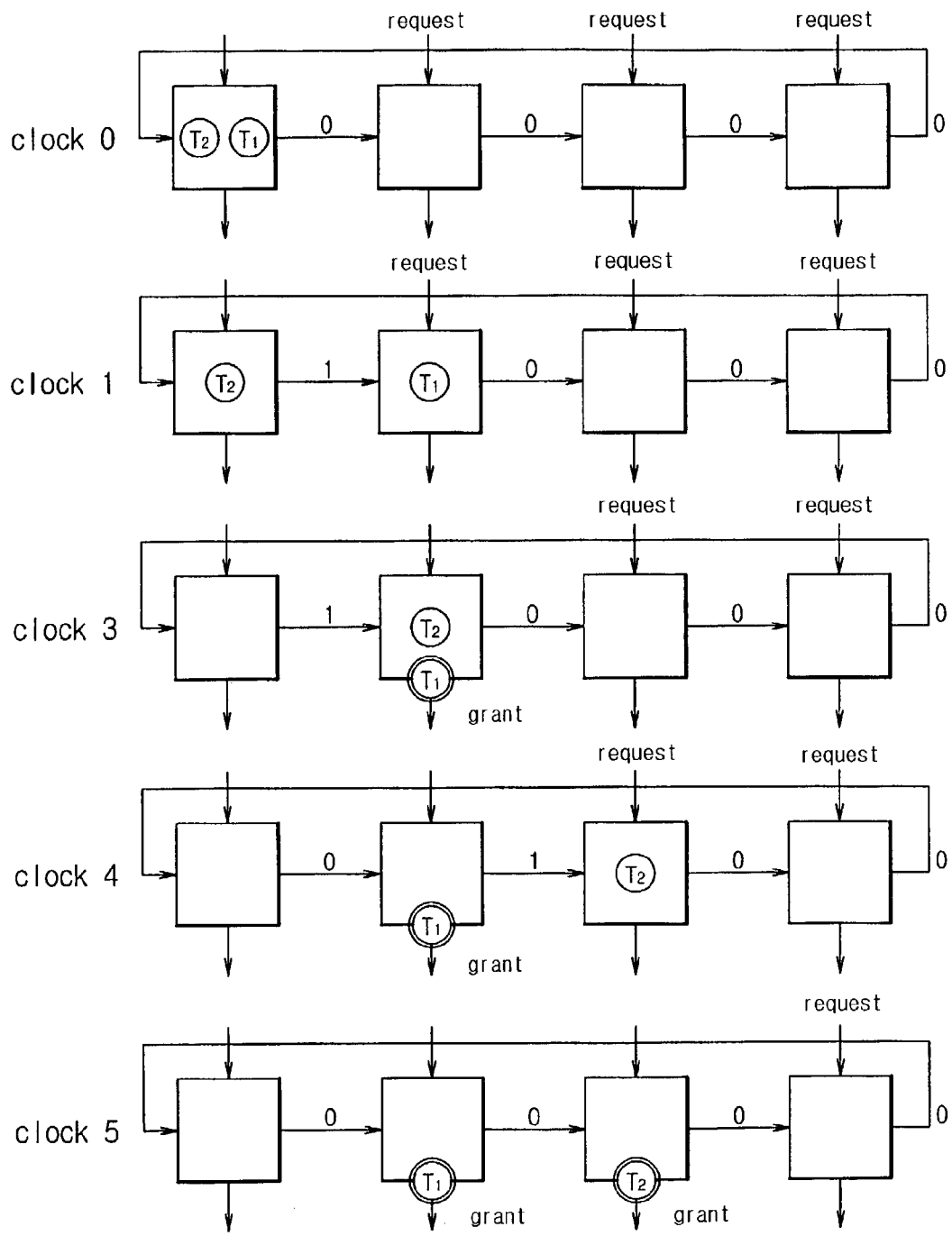
FIG. 7 illustrates a timely-distributed implementation of the multi-token-based arbiter in the present invention.

To avoid this disadvantage of the straightforward implementation, timely-distributed tokens may be considered on a token-ring arbiter as shown in FIG. 7, wherein the tokens given for an arbiter are emitted sequentially clock by clock. In FIG. 7, initially, a module in a token-ring arbiter has all tokens, and the module emits the tokens one by one for every clock. When a module which has a request (or grant) receives a token, it grabs the token and grants the request. The module with no request (or grant) passes a received token to the next module. While this implementation does not require additional hardware for multiple tokens, its scheduling time increases by the number of tokens. Hence, if the number of tokens is k, the scheduling for an N×N switch is completed in N+k clocks.

Figure 8:
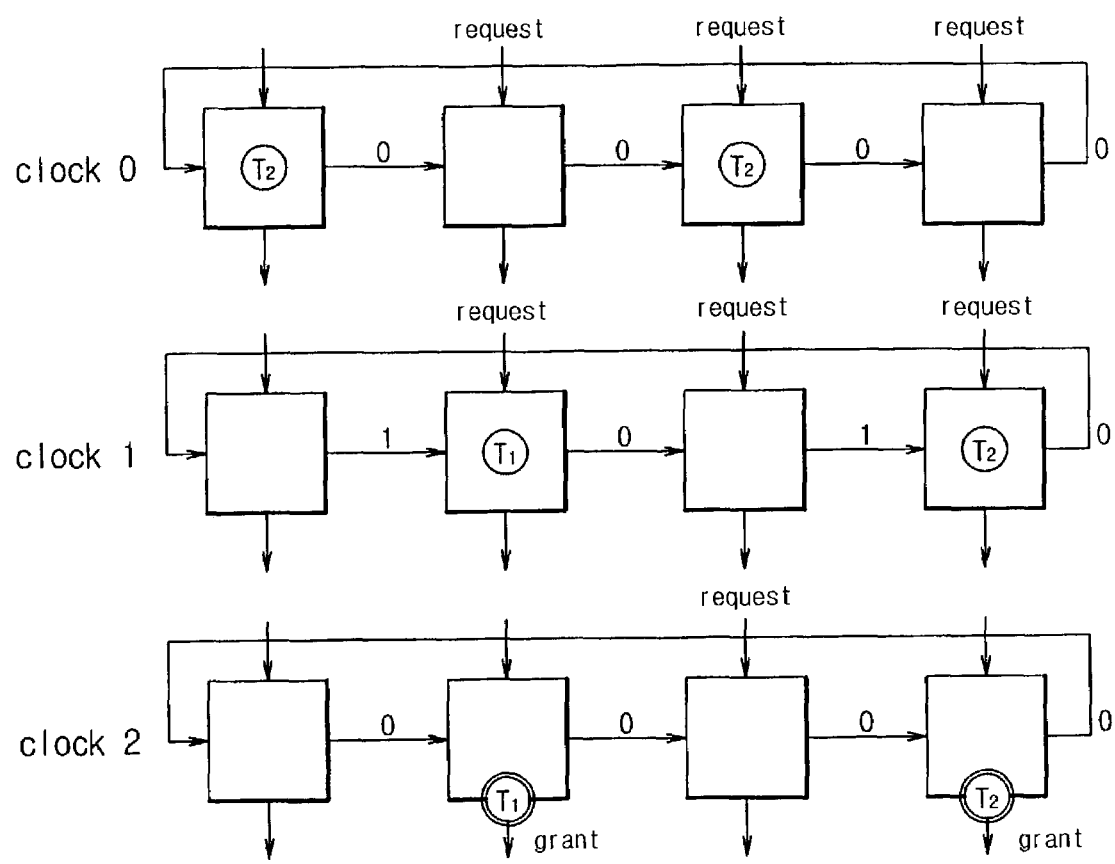
FIG. 8 illustrates a spatially-distributed implementation of the multi-token-based arbiter in the present invention.

As another solution which requires no additional hardware and no additional scheduling time, a token-ring arbiter with spatially-distributed tokens are considered. As shown in FIG. 8, the tokens in this arbiter are initially distributed to the modules selected by a certain rule (described below), and each of spatially-distributed tokens visits the modules in a round-robin manner independently along the token ring clock by clock. These modules which initially have tokens are called "initiators". The basic principle for the rule of selecting the initiators is that two tokens should not be assigned to a module simultaneously. If this basic principle is not obeyed, the arbiter has the same problem as the two previous arbiters for which we have to spend additional hardware or additional scheduling time. Each of the tokens operates independently requiring at most N clocks. Therefore, it requires no additional scheduling time. Hereinafter, the multi-token-based arbiter with spatially-distributed tokens are referred to as "spatially-distributed multi-token-based arbiter".

A method to distribute tokens obeying this basic principle is, for example, that if a module grabs a token for its request (or grant), the module becomes an initiator for the next time slot. This method is most preferable in consideration of the balance for each of input ports and output ports. Another method to distribute tokens obeying this basic principle is that if a module of an arbiter for the grant phase grabs a token for a request which is not accepted in the next phase, the module is discharged as an initiator and the previous initiator of the token is selected for the next time slot.

Second, for a FIFO queuing discipline, a queue management scheme to avoid mis-sequencing of packets is explained below.

Figure 9:
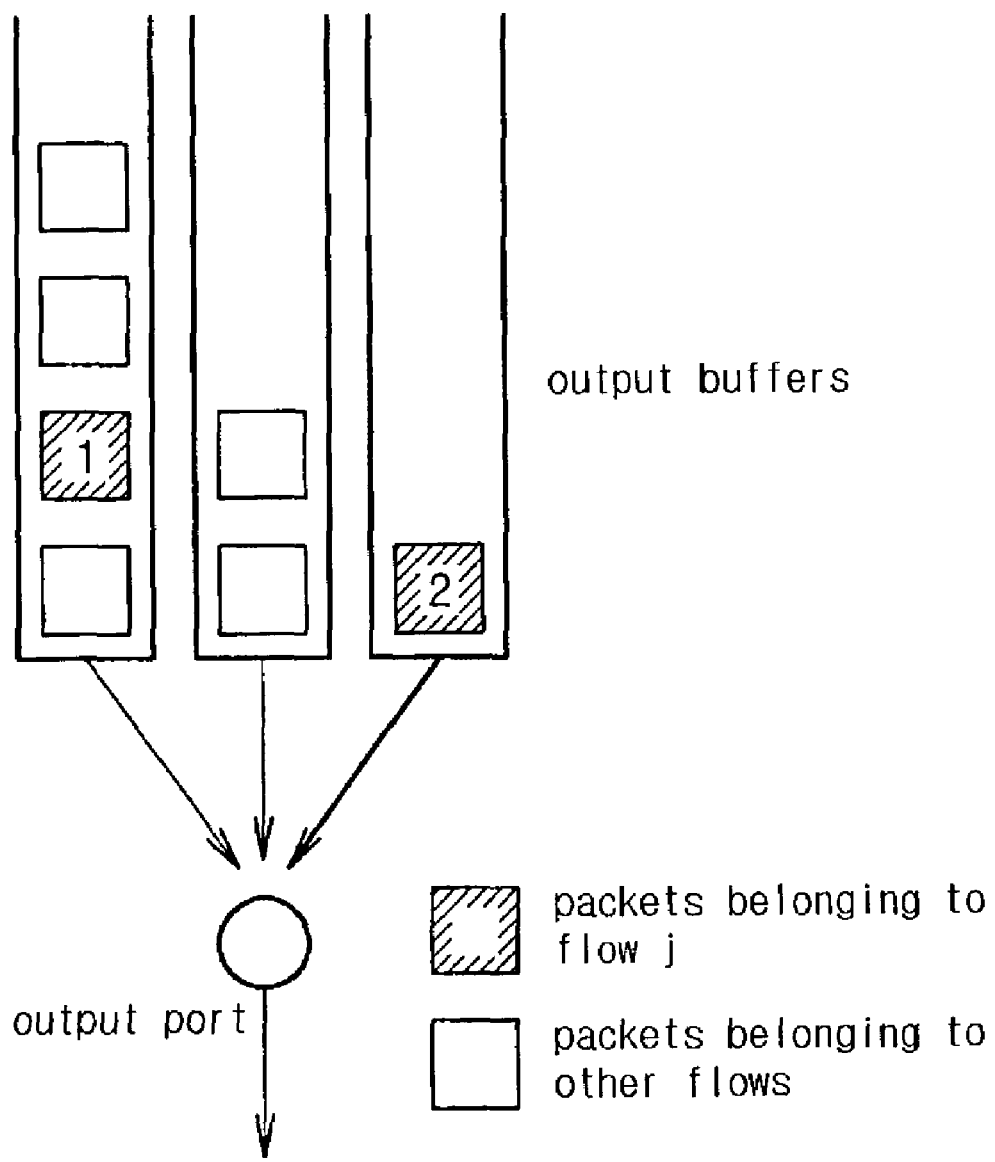
FIG. 9 illustrates an example of the mis-sequence problem in the MIOQ switch.

Since each output of the MIOQ switch according to the present invention has multiple buffers, the sequence of the packets which belong to the same flow can be mis-ordered in multiple output buffers. FIG. 9 shows an example of this mis-sequence problem in an MIOQ switch, wherein two packets. (i.e., packet 1 and packet 2) belong to a flow j. Since it is assumed that packet 1 is prior to packet 2 in the sequence of flow j, packet 1 arrives at the output prior to packet 2. However, while packet 1 waits in a congested buffer, packet 2 arrives at an empty buffer and departs from the buffer prior to the packet 1. Consequently, the sequence of the packet 1 and the packet 2 at the output is reversed.

Figure 10:
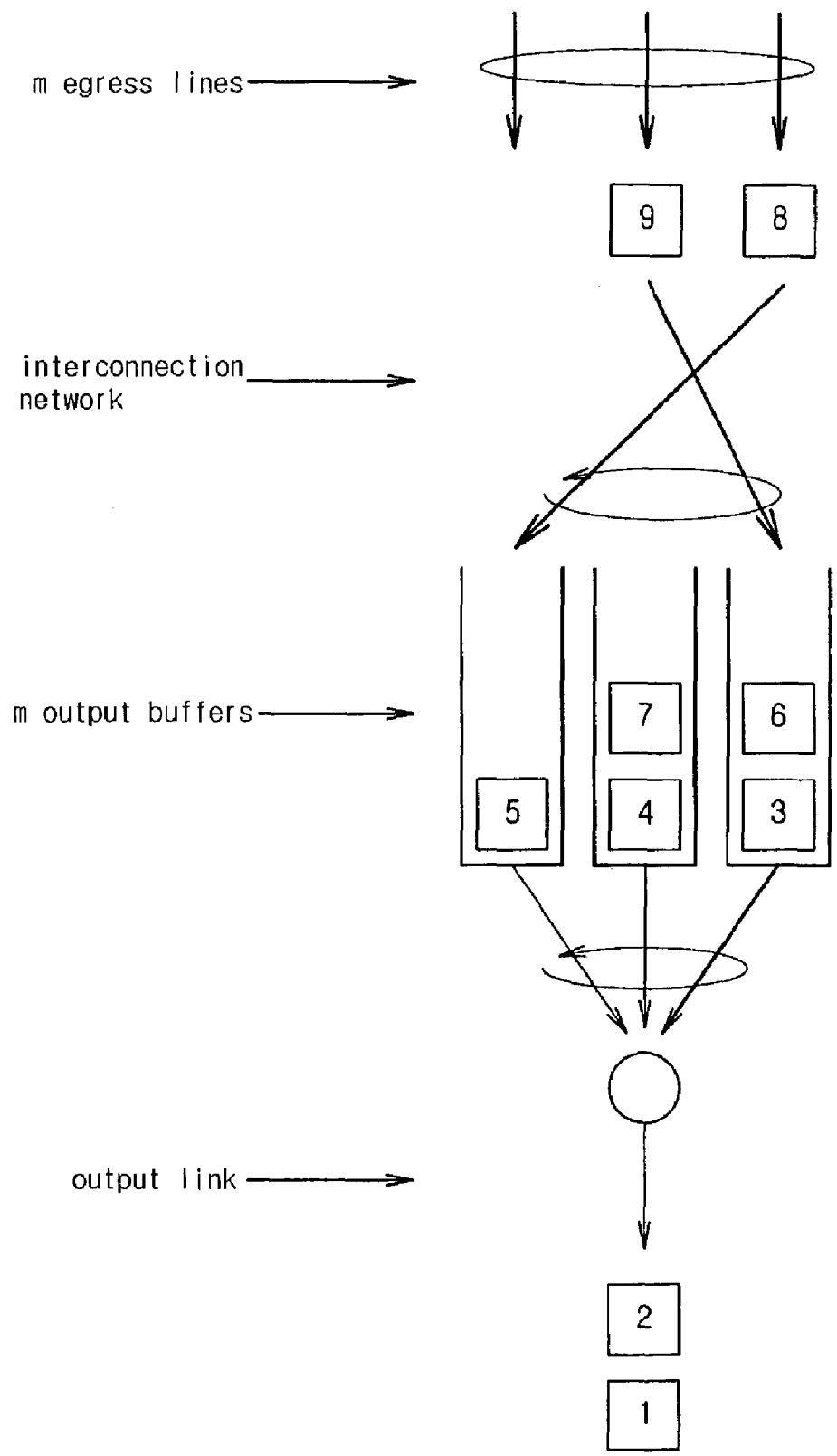
FIG. 10 illustrates an example of the queue management scheme of virtual FIFO queueing used in the present invention.

To maintain the order of packets which belong to the same flow in the MIOQ switch, a queue management scheme for multiple output buffers which operates in a simple round-robin manner are considered. This scheme is referred to as a virtual FIFO queueing. The proposed scheme distributes at most m packets arriving at an output from m egress lines to m buffers in a round-robin order and takes out packets one-by-one according to the same round-robin order. Therefore, multiple buffers managed by the proposed scheme can run the same as a FIFO queue on the whole. FIG. 10 illustrates the queue management scheme for three output buffers at an output. In this figure, packet 8 and packet 9 which arrive at the output in a time slot are distributed into the buffers selected in a round-robin order, and packet 3 goes out into the output port according to the same round-robin order.

On the input side, packets of a flow are stored in a virtual output queue (VOQ) which corresponds to its output, and the MIOQ switch allows only one packet to be removed from a VOQ in a time slot. Therefore, at most one packet per flow arrives at an output in a time slot. Since the proposed scheme does not reverse the arrival sequence of packets from time slot to time slot, it can guarantee the order of packets which belong to the same flow.

Figure 11:
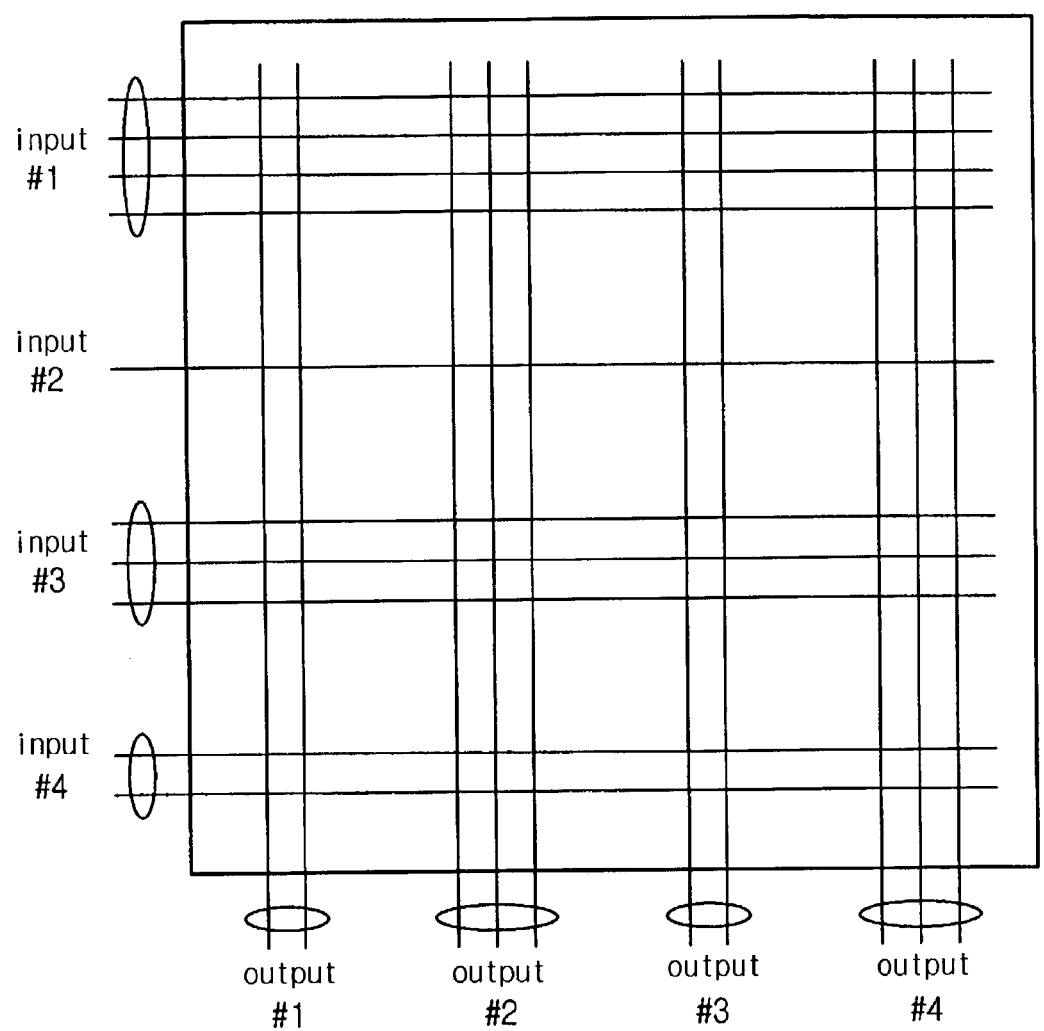
FIG. 11 illustrates an asymmetric MIOQ switch according to the present invention.

The MIOQ switch according to the present invention has an additional advantage in that it is possible to implement asymmetric switches. For a symmetric MIOQ switch with a (k,m)-dim crossbar, all inputs and outputs of the switch have k ingress and m egress lines, respectively. However, there is no restriction against making the MIOQ switch asymmetric according to the present invention. Each input and output can have an arbitrary number of ingress and egress lines, respectively. An asymmetric switch is defined as a switch wherein the bandwidth for each input and output is provided asymmetrically. Therefore, an asymmetric switch may have different ingress lines (or egress lines) for each port. FIG. 11 shows a 4×4 MIOQ switch with asymmetric switching bandwidth for inputs and outputs. In this figure, the numbers of ingress lines corresponding to input ports are 4, 1, 3 and 2 from the upper input port to the lower input port. The numbers of egress lines corresponding to output ports are 2, 3, 2 and 3 from the left output port to the right output port. The asymmetric bandwidth can be provided by the asymmetric numbers of ingress lines and egress lines.

Figure 12:
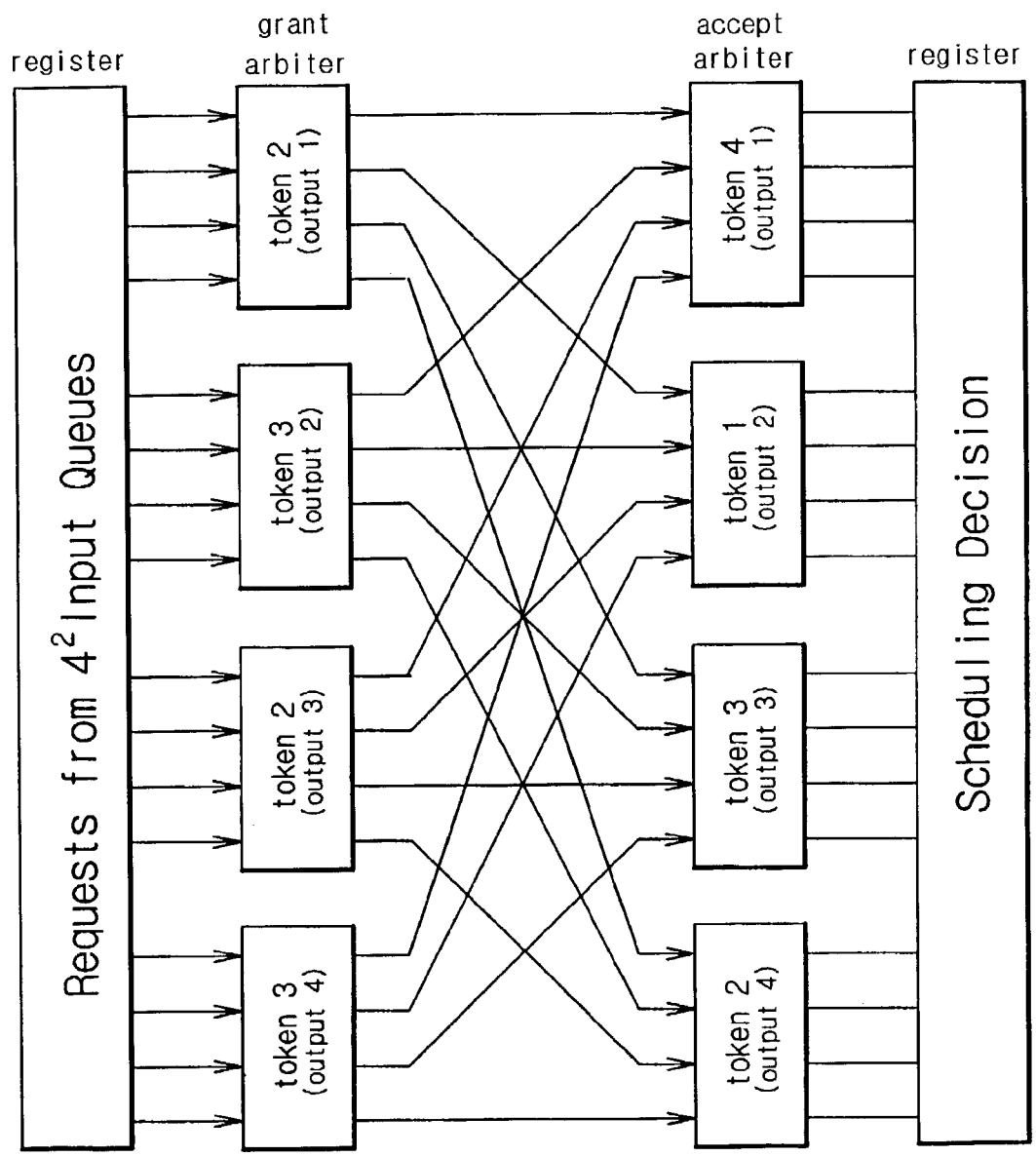
FIG. 12 illustrates a scheduler for the asymmetric MIOQ switch in FIG. 11.

A scheduler for this asymmetric MIOQ switch is required to make a scheduling decision for uneven numbers of ingress (and egress) lines according to inputs (and outputs). Considering an iterative matching scheme for the scheduler, an arbiter for an input has to grant up to the same number of requests as its ingress lines of the input, and for an output, it has to accept up to the same number of grants as the egress lines of the output. Hence, the scheduler composed of multi-token-based arbiters each of which has the same number of tokens as the ingress (or egress) lines of the corresponding input (or output) can be used. FIG. 12 shows a scheduler corresponding to the 4×4 asymmetric switch given in FIG. 11. The basic structure of the scheduler is the same as that for the symmetric MIOQ switches, but the arbiters in the scheduler have an unequal number of tokens according to their switching bandwidth. For example, the first accept arbiter which corresponds to input 1 with four ingress lines has four tokens. Similarly, the second accept arbiter which corresponds to output 2 with three egress lines has three tokens. This results from the fact that each of the arbiters in the scheduler operates independently.

The asymmetric switch is useful in the case that the operation rates for ingress lines and egress lines are different from each other. The example for such case is that 10 Mbps is required to the input 1 and 40 Mbps is required to the input 2. The proposed switch can be connected to heterogeneous external links which operate at different rates. This asymmetric switch may be very useful for an Internet architecture where switches are connected with each other via different numbers of wavelength channels according to their traffic demands. If a wavelength channel transmits traffic at the same rate of internal links, the same number of ingress (or egress) lines may be assigned as that of the wavelengths at the corresponding link. The proposed switch does not require any speedup as the number of wavelengths increases at a link, and moreover, it can operate at a slower rate than the external link speed by increasing the number of ingress (or egress) lines. For example, the switch can use two ingress (or egress) lines of a rate r/2 for an external link whose operation rate is r. This feature is useful under the circumstance that the transmission capacity through optical fibers has increased.

The MIOQ switch illustrated in FIG. 4 comprises one crossbar fabric of a large size. However, it is not easy to implement the crossbar fabric of a large size prac. Therefore, the MIOQ according to the present invention may have multiple crossbar fabrics of a small size, which is easy to implement.

Figure 13:
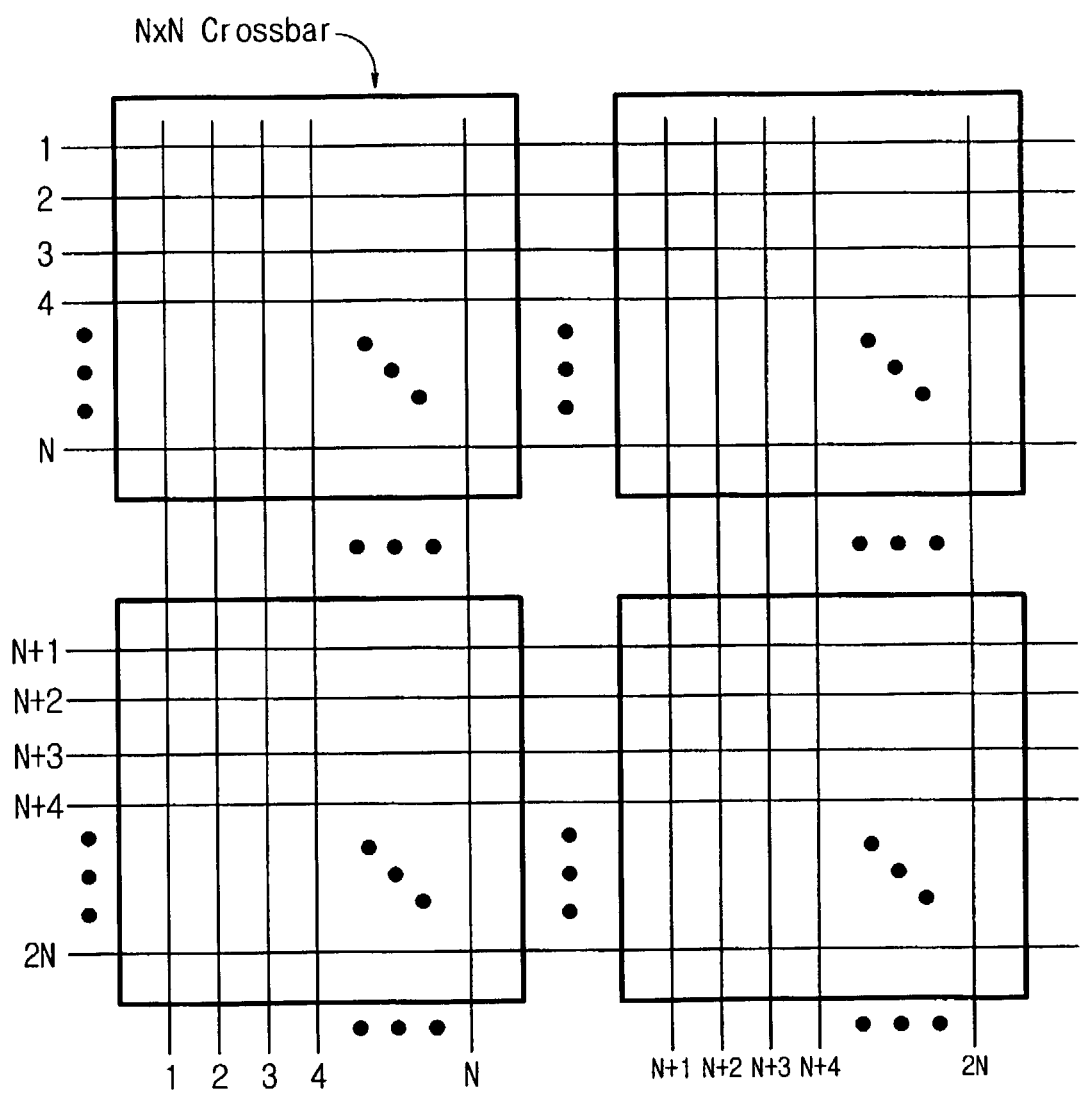
FIG. 13 illustrates a method for constructing a large-size crossbar fabric by connecting small-size crossbar fabrics linearly.

FIG. 13 shows a straightforward approach for constructing a 2N×2N switch with four N×N crossbar switches. This approach requires four linearly-connected crossbar switches.

Figure 14:
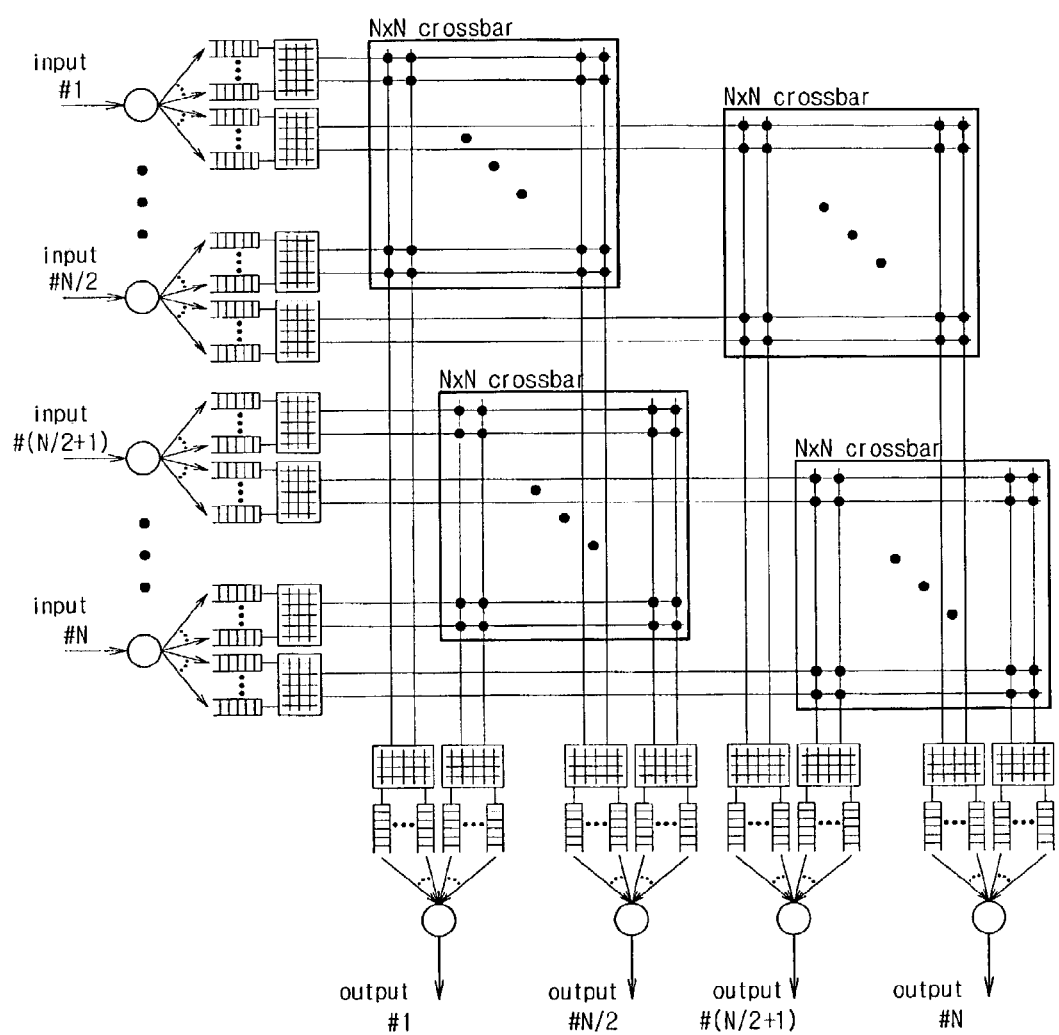
FIG. 14 illustrates a decomposing method for constructing a large-size crossbar fabric for implementation of the MIOQ switch according to the present invention.

There is another more attractive scheme based on the decomposing method. Since an MIOQ switch uses virtual output queueing at inputs, the routing path for each VOQ within the switch can be separated from the paths for other VOQs. Hence, the VOQs can be divided into k groups and an N×N/k switch can be allocated to each group. Also, employing k groups of multiple buffers at each output, k groups can be further divided into k×k groups according to their inputs and an N/k×N/k switch is allocated to each group. FIG. 14 shows an N×N MIOQ switch composed of four (2,2)-dim crossbar, each of which is for an N/2×N/2 MIOQ switch and topologically equivalent to an N×N crossbar switch. While the proposed scheme requires the same number of crossbar switches as the straightforward approach as shown in FIG. 10, it can decrease the contention probabilities in inputs and outputs and yield better performance.

To implement the N input buffers of the MIOQ switch according to the present invention, conventional memories may be used by a redundant buffering scheme.

As depicted in FIG. 4, the MIOQ switch according to the present invention uses N input buffers at each of the input ports to prevent head-of-line blocking. In the conventional input-queued switches, a packet from only one buffer among the N input buffers is allowed to be transmitted in a time slot. Therefore, in the conventional input-queued switches, N input buffers are implemented logically in one conventional memory. However, in the present invention, more than one packet may be transmitted from multiple buffers in a time slot. The MIOQ switch requires any k of N input buffers to be accessed simultaneously because the switch has k ingress lines. This means that N input buffers cannot be implemented logically on a single memory as in a conventional input-queued switch.

Therefore, N input buffers should be implemented in a separated manner wherein each of buffers has its own independent interface. Thus, it is required to implement the independent buffers and interfaces on a semiconductor circuit designed specially. Otherwise, the N buffers should be implemented on N physical memory devices which are connected to an interconnection network. However, as a natural result, this approach has some drawbacks: First, the area and power requirements of a line card which contains N input buffers increase. Second, memory-space sharing between buffers is impossible, which leads to inefficient usage of finite memory space.

Figure 15:
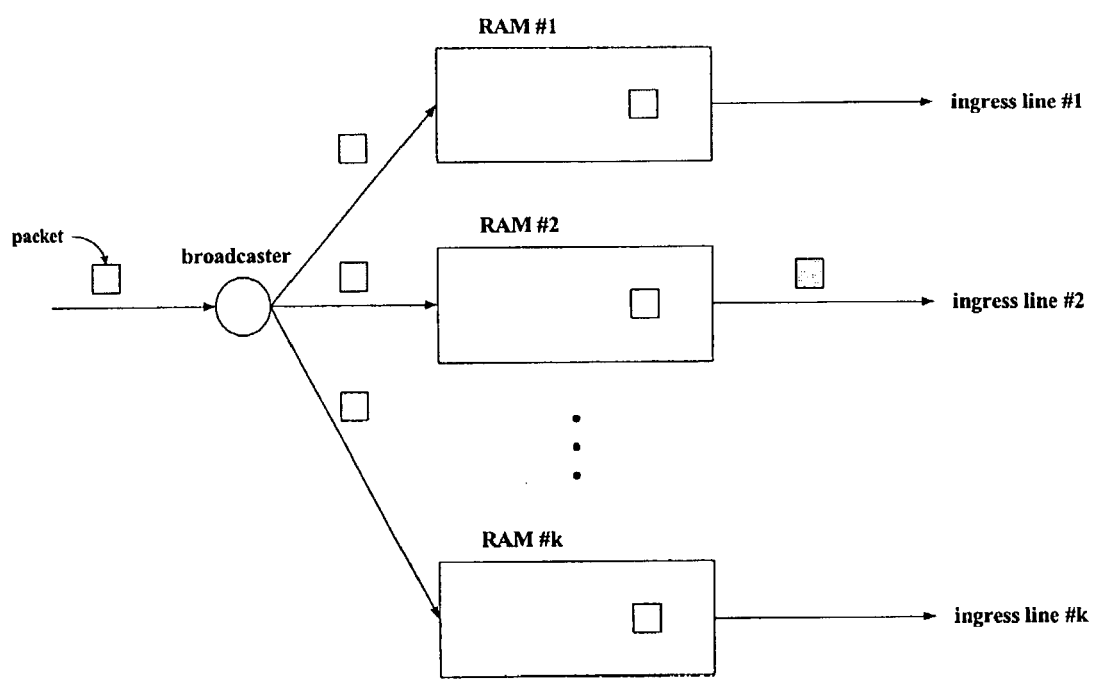
FIG. 15 illustrates an implementation of N input buffers of the MIOQ switch according to the present invention using the conventional memory in redundancy.

To resolve such problems, a method which is called redundant buffering is considered to implement N input buffers by using conventional memory. FIG. 15 illustrates the implementation of N input buffers of the MIOQ switch according to the present invention by using conventional memories in redundancy. As shown in FIG. 15, a redundant buffer for an MIOQ switch is composed to k physical memories. Each of k memories in a redundant buffer contains N logically-separated input buffers as in a conventional input-queued switch. That is, the memory space is allocated logically for N buffers, and the memory addresses for the start and the end point of each buffer are memorized separately. If a logical buffer is determined to transmit a packet, the packet recorded in a memory address which indicates the end of this buffer (hereinafter, such a memory address is referred to as a "pointer") is read and the value of the pointer is changed to the new address corresponding to the next packet.

In the redundant buffer, k memories maintain the same contents redundantly, in other words, each memory of a redundant buffer has all cells in N input buffers. That is, the k memories store the same contents in redundancy. When a packet arrives, the packet is sent to each memory simultaneously using the broadcaster, and the same packet is stored at the same location of each memory. For transmitting packets, different buffers are selected in each memory and the packets for the selected buffers are outputted. After transmitting, all of the memories change the values of pointers as if the outputted packets are sent from one memory.

For example, in the N input buffers implemented on 3 memories as a redundant buffer, the same contents of N logical input buffers are stored in each of 3 memories. If the packet corresponding to the 3rd buffer in the first memory is outputted, the packet corresponding to the 7th buffer in the second memory, and the packet corresponding to the 10th buffer in the third memory, then, all of the three memories change the values of pointers corresponding to the 3rd buffer, the 7th buffer and the 10th buffer to new values of addresses that indicate the next packet. Therefore, the pointer for each buffer of all the memories are maintained identically.

As a result, a redundant buffering scheme requires k times the amount of conventionally-used memory, which is a penalty of this scheme. However, compared with the cell arrival rate at each input, a (k,m)-dimensional crossbar fabric for k>1 and m>1 provides sufficient bandwidth transferring cells from inputs to outputs, which means that most of the cells in an MIOQ switch are stored in output buffers instead of input buffers. Therefore, in an MIOQ switch, large memory space is not required for input buffers, and thus, the memory-space penalty of the redundant buffering scheme is not critical in practice. Hence, in an MIOQ switch with redundant buffers, when k cells have to be read simultaneously from k different input buffers at an input, each cell can be read from one of k memories, respectively.

In the implementation of N input buffers with conventional memories in redundancy, interconnection networks which connect N input buffers with ingress lines are not necessary. Therefore, as shown in FIG. 15, memory interfaces are directly connected to ingress lines by one-to-one. The advantage of the memory redundancy method is that conventional memories can be used in the implementation of N input buffers without designing special semiconductors.

Figure 16A:
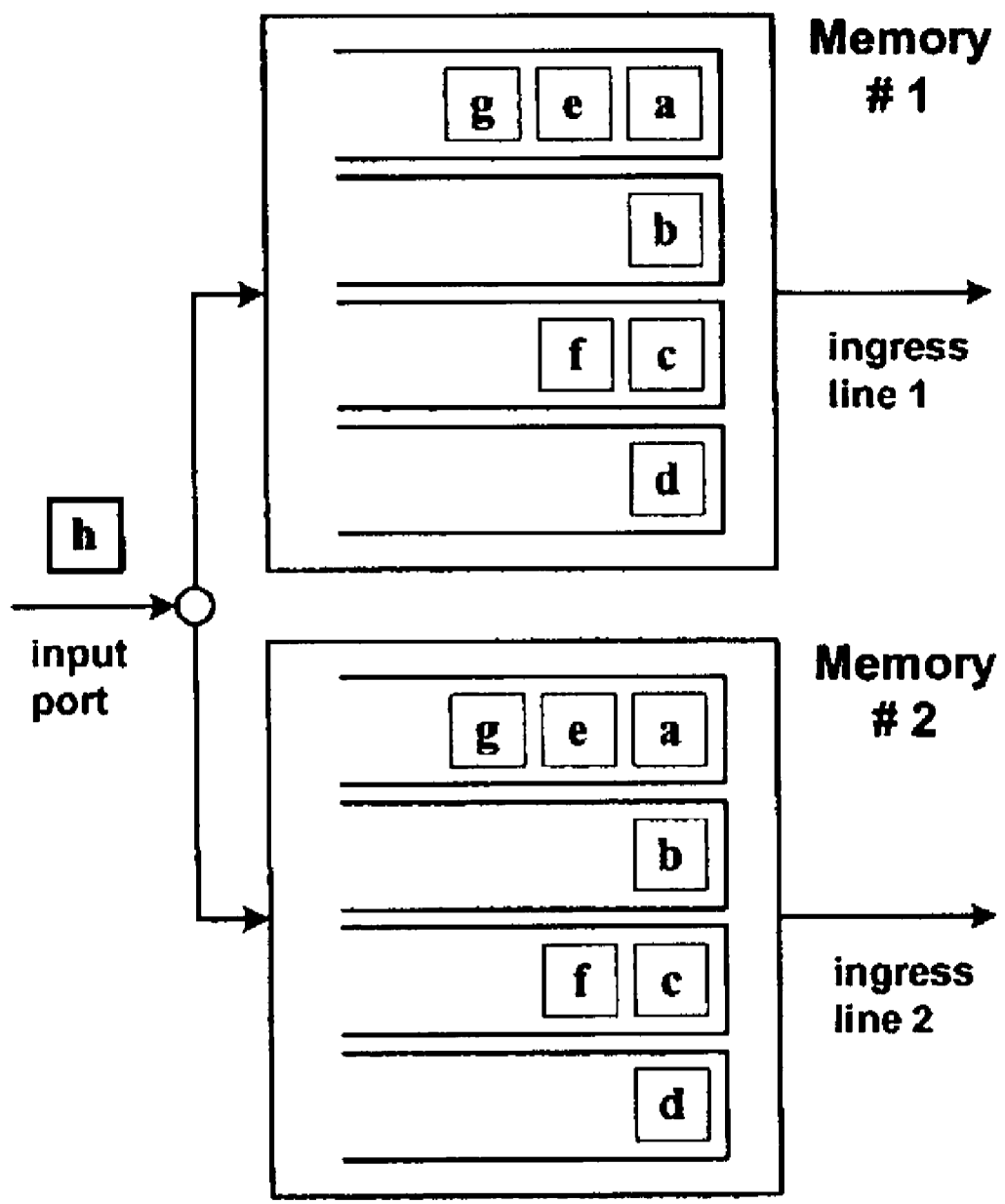
FIGS. 16A and 16B illustrate a write operation of a redundant buffer which is composed of two memories.
Figure 16B:
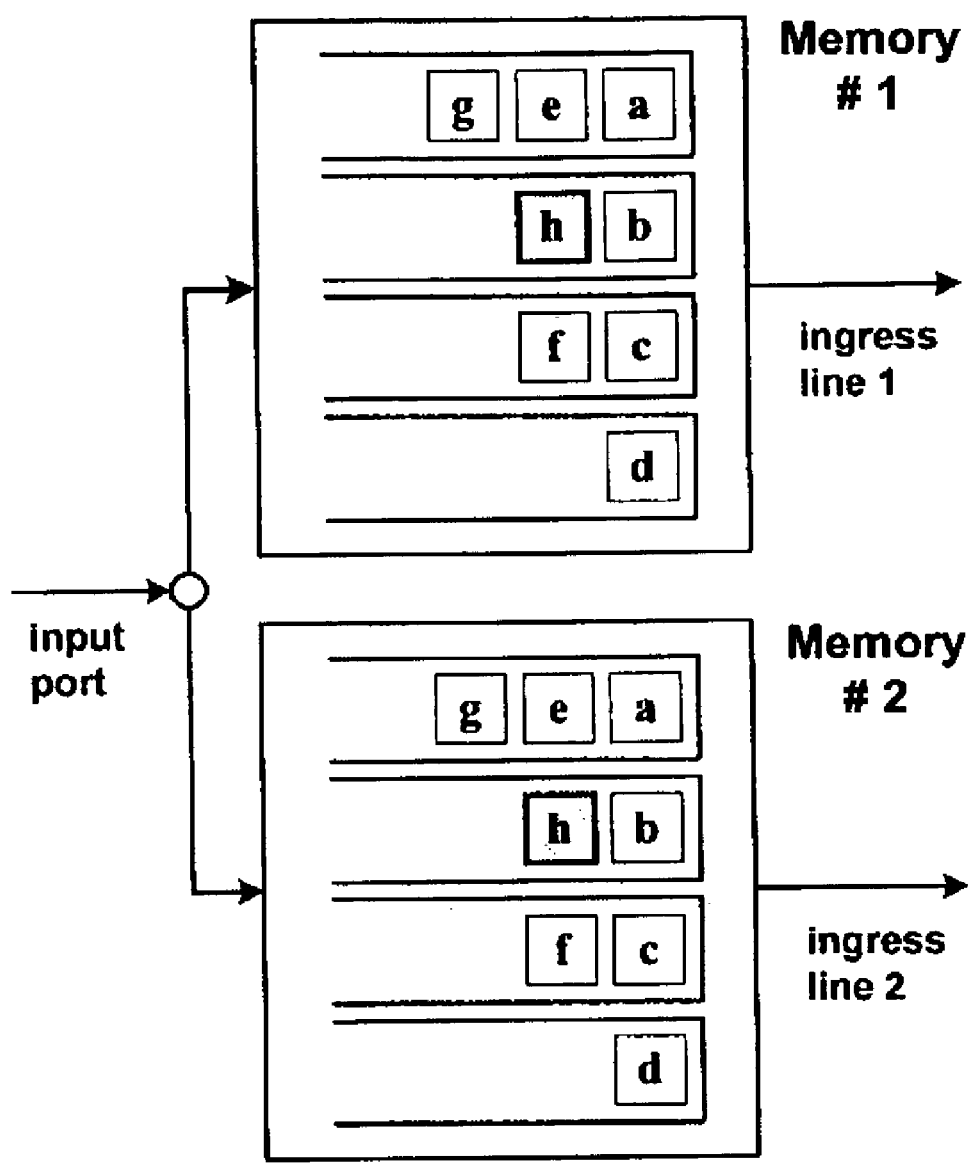

FIGS. 16A, 16B, 17A and 17B illustrate write and read operations of a redundant buffer which is composed of two memories i.e., Memory 1 and Memory 2. As shown in FIGS. 16A and 16B, when a new cell h arrives at a redundant buffer (FIG. 16A), both memories write the cell in the same location (FIG. 16B)

Figure 17A:
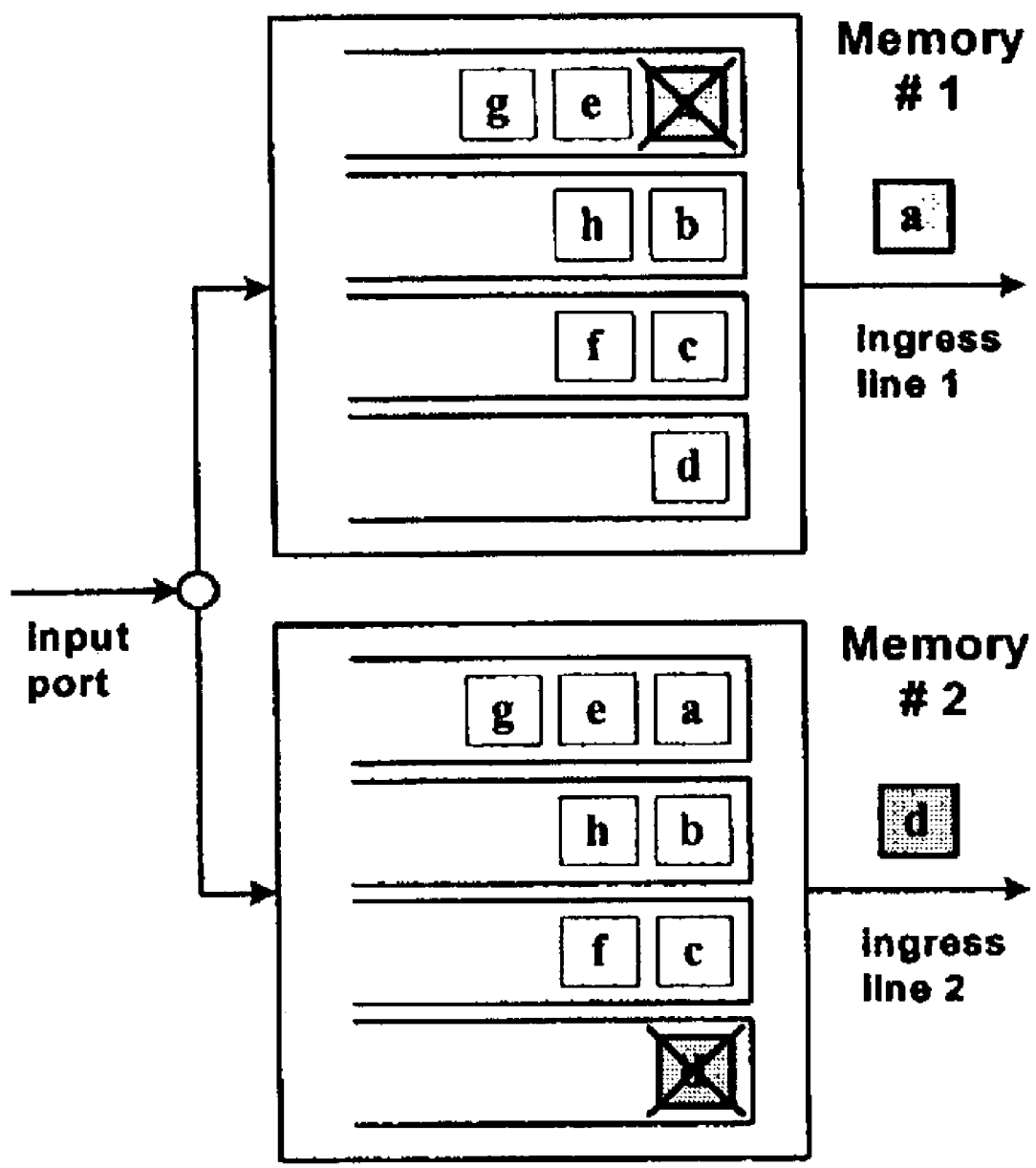
FIGS. 17A and 17B illustrate a read operation of a redundant buffer which is composed of two memories.
Figure 17B:
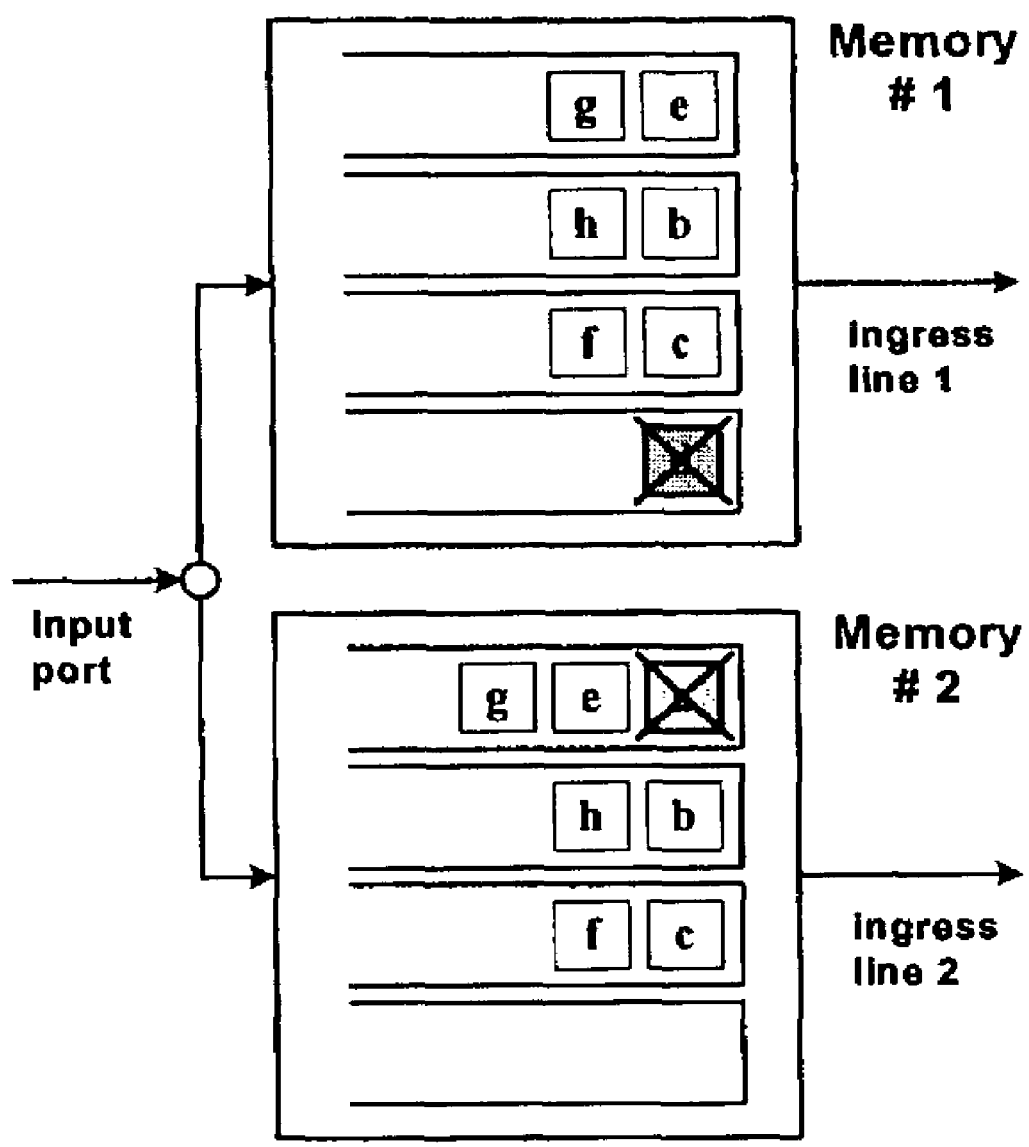

When two cells, cell a and cell d, are required to be read from two different buffers as shown in FIGS. 17A and 17B, cell a and d are read from Memory 1 and 2, respectively (FIG. 17A). After the read operation, the cell which has been read from one memory has to be eliminated in the other memory (FIG. 17B). This operation can be done logically with no memory access by updating the pointer register which points to the corresponding cells as in a conventional input-queued switch. A redundant buffer does not need interconnection networks to connect with ingress lines and, memories of a redundant buffer are directly connected to ingress lines one by one.

The MIOQ switch according to the present invention requires no "speed-up". Especially, a scheduler and a queue management method which can be implemented easily is provided and performance matches the performance of an output-queued switch.

What is claimed is:

1. A multiple input/output-queued switch of which size is N comprising:
    a (k,m)-dimensional crossbar fabric having k ingress lines at each input and m egress lines at each output;
    N input buffers at each input;
    M output buffers at each output;
    N×k interconnection networks each of which is able to move up to k packets from the N input buffers to the k ingress lines; and
    m×M interconnection networks each of which is able to move up to m packets arrived at each output from the m egress lines to the M (wherein M is equal to or more than m) output buffers.

2. The multiple input/output-queued switch according to claim 1, which further comprises a scheduler which includes multi-token-based arbiters which select multiple requests (or grants) using multiple tokens.

3. The multiple input/output-queued switch according to claim 2, wherein the multi-token-based arbiter with k (or m) tokens includes $\log_2 k$ (or $\log_2 m$) control lines and N modules.

4. The multiple input/output-queued switch according to claim 3, wherein the multi-token-based arbiter has multiple tokens which together pass the modules every clock, and one of the multiple tokens is grabbed by a module which has a request.

5. The multiple input/output-queued switch according to claim 2, wherein the multi-token-based arbiter has timely-distributed tokens.

6. The multiple input/output-queued switch according to claim 5, wherein a certain module has all tokens, the module emits the tokens one by one every clock, and one of the tokens is grabbed by a module which has a request.

7. The multiple input/output-queued switch according to claim 2, wherein the multi-token-based arbiter has spatially-distributed tokens.

8. The multiple input/output-queued switch according to claim 7, wherein the tokens are initially distributed to the selected modules, the distributed tokens pass the modules independently clock by clock, and the token is grabbed by a module which has a request.

9. The multiple input/output-queued switch according to claim 1, wherein, according to the discipline of FIFO(First Input First Output), the packets delivered to the output are stored at the output buffers in a round-robin manner in order to maintain the sequence of packets, and then sent to the external output.

10. The multiple input/output-queued switch according to claim 2, wherein the number of tokens in multi-token-based arbiter corresponding to each input or output is configured to be same as the number of corresponding ingress lines or egress lines if the switch is asymmetric one wherein the number of ingress lines (in case of input port) or egress lines (in case of output port) are not identical for each port.

11. The multiple input/output-queued switch according to claim 10, wherein the bandwidth of each input or output of the asymmetric switch is determined by the number of ingress lines or egress lines.

12. The multiple input/output-queued switch according to claim 1, wherein the (k,m)-dimensional crossbar fabric is implemented by connecting crossbar fabrics whose size is smaller than that of the (k,m)-dimensional crossbar fabric linearly.

13. The multiple input/output-queued switch according to claim 1, wherein the (k,m)-dimensional crossbar fabric is implemented based on a decomposing method.

14. The multiple input/output-queued switch(MIOQ) according to claim 13, wherein virtual output queueings at the input of the MIOQ are divided into k groups, k groups of multiple buffers at the output of the MIOQ are further divided into k×k groups, and an N/k×N/k switch is allocated to each group.

15. The multiple input/output-queued switch according to claim 1, which operates at a slower rate than external input rate.

16. The multiple input/output-queued switch according to claim 1, wherein N input buffers are implemented as a redundant buffer.

17. The multiple input/output-queued switch according to claim 16, wherein each memory space is allocated logically for N buffers, the memory addresses for the start and the end point of each buffer are memorized separately, and all the memories changes the values of pointers to new values of addresses that indicate the next packet if a packet is transmitted.

* * * * *